Jan. 2, 1923.

H. C. SUTCLIFFE.
CLUTCH LOCK FOR TRACTORS.
FILED APR. 8, 1922.

H. C. Sutcliffe
INVENTOR

BY Victor J. Evans
ATTORNEY

Jan. 2, 1923.
H. C. SUTCLIFFE.
CLUTCH LOCK FOR TRACTORS.
FILED APR. 8, 1922.
1,441,186.
2 SHEETS—SHEET 2.
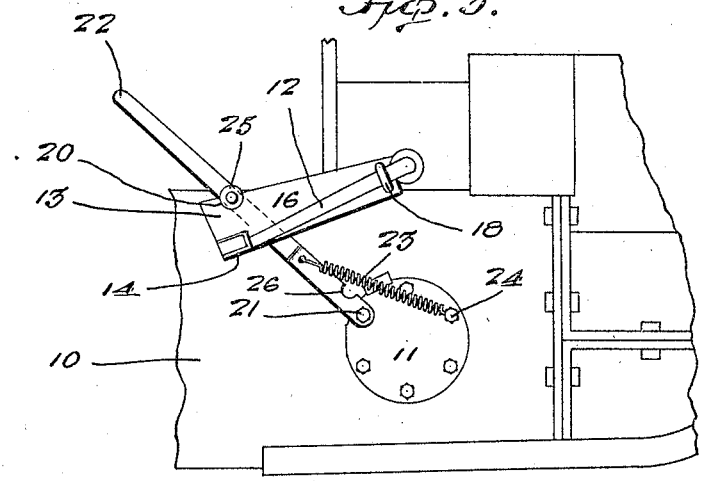
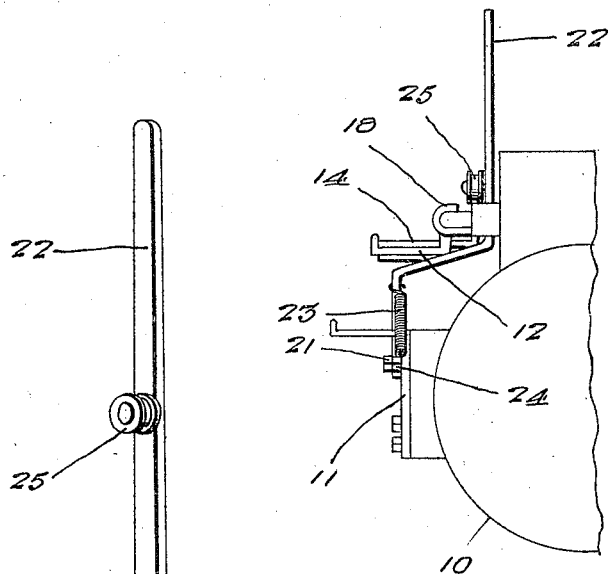
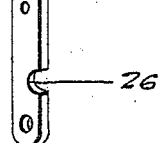
H. C. Sutcliffe
INVENTOR
BY Victor J. Evans
ATTORNEY Patented Jan. 2, 1923.

1,441,186

UNITED STATES PATENT OFFICE.

HARRY C. SUTCLIFFE, OF BLACK EARTH, WISCONSIN.

CLUTCH LOCK FOR TRACTORS.

Application filed April 8, 1922. Serial No. 550,797.

*To all whom it may concern:*

Be it known that I, HARRY C. SUTCLIFFE, a citizen of the United States, residing at Black Earth, in the county of Dane and State of Wisconsin, have invented new and useful Improvements in Clutch Locks for Tractors, of which the following is a specification.

This invention relates to clutch pedal locks for Fordson tractors.

An object of the present invention is the provision of means whereby the clutch pedal of a tractor may be held in neutral position so as to relieve the operator when it is desired to run the engine with the tractor idle.

To this end, the invention includes a pedal carried member and a manually controlled pivotally mounted member engageable therewith, both of said members being secured in position without the necessity of boring holes in the tractor structure or otherwise weakening the same.

Another object of the invention is the provision of a clutch pedal holding means which may also be utilized to depress and move the pedal to neutral position and to engage and hold the pedal in such position.

With the above and other objects in view, the invention further includes the following novel features and details of construction, to be hereinafter more fully described, illustrated in the accompanying drawings and pointed out in the appended claims.

In the drawings:—

Figure 4 is a fragmentary front view with the parts in the position shown in Figure 1.

Figure 5 is a detail perspective view of the pedal carried member.

Figure 6 is a similar view of the locking lever.

Figure 1:
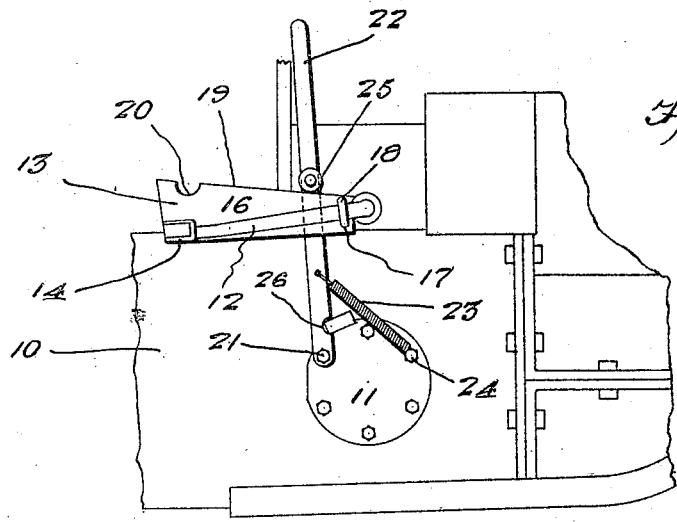
Figure 1 is a side elevation of a portion of a Fordson tractor with the invention applied.
Figure 2:
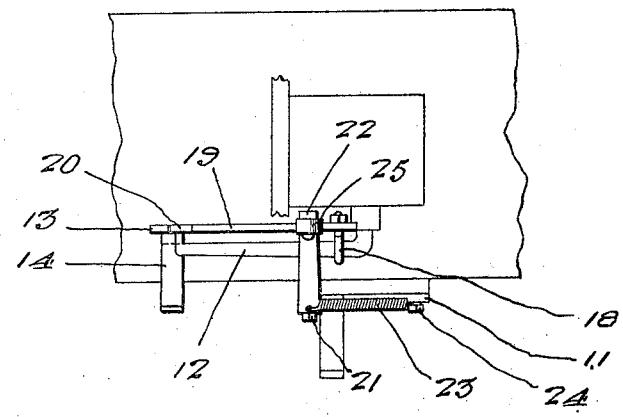
Figure 2 is a top plan view of the same.
Figure 3:
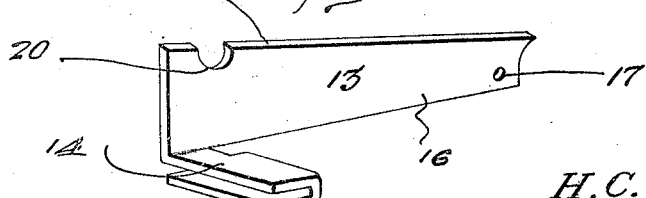
Figure 3 is a view similar to Figure 1 with the clutch pedal held in neutral position.

Referring in detail to the drawings, wherein like characters of reference denote corresponding parts, the reference character 10 indicates a portion of the housing of a Fordson tractor having the usual foot bracket 11 and clutch pedal 12.

In the position shown in Figure 1, this pedal is in engaged position and must be depressed against the action of a spring for the purpose of disengaging the clutch to disengage the engine from the transmission mechanism. In order to hold the clutch in such disengaged position, the present invention provides a guide plate 13 which is substantially L-shaped in configuration and includes a channeled arm 14 which is engaged over the clutch pedal. The other arm 16 of the guide plate 13 is provided at its outer end with an opening 17. This opening is adapted to receive a hook bolt 18, which is connected to the outer end of the clutch pedal 12. The arm 16 of the guide plate is provided with an inclined edge 19 and this edge is interrupted by a notch 20 located near the inner end of the arm.

Pivotally mounted upon one of the bolts 21 of the foot bracket 11 is an operating lever 22 and this lever has connected thereto one end of a spring 23, whose opposite end is attached to another of the bolts of the foot bracket as shown at 24. The lever 22 has mounted thereon a grooved roller 25.

In the operation of the invention, the parts are normally in the position shown in Figure 1, in which position the clutch is engaged so as to connect the engine with the transmission mechanism. When it is desired to disengage the clutch and to leave the said clutch disengaged for an appreciable period, the clutch pedal is forced downward against the action of its spring to its disengaged position. This may be done either by pressure with the foot, or the lever 22 may be moved rearward so that the roller 25 will ride along the inclined edge 19 of the arm 16 until it reaches the notch 20. The roller 25 will then enter the notch and hold the pedal in neutral position, that is, with the clutch disengaged. To again engage the clutch it is only necessary to force the pedal slightly downward to release the roller 25, whereupon the spring 23 will move the lever 22 forward until the bracket 11 engages a notch 26 provided in said lever, and permit the pedal to move upward so that the clutch will again engage.

The invention is susceptible of various changes in its form, proportions and minor details of construction and the right is herein reserved to make such changes as properly fall within the scope of the appended claims.

Having described the invention what is claimed is:—

1. The combination with a tractor having a clutch pedal, of a spring actuated lever pivotally mounted upon the tractor housing, a guide plate carried by the clutch pedal and means carried by the lever and detachably engaging a notch provided in the guide plate for holding the pedal in neutral position.

2. The combination with a tractor having a clutch pedal, of a spring connected lever pivotally mounted upon the tractor housing, a guide plate carried by the clutch pedal, an inclined notched edge for the guide plate and a roller carried by the lever for operating over the inclined edge, whereby the clutch pedal may be moved to a neutral position and the roller engaged in the notch to hold the pedal against accidental movement.

In testimony whereof I affix my signature.

HARRY C. SUTCLIFFE.